(12) United States Patent
Dawn

(10) Patent No.: US 6,668,705 B1
(45) Date of Patent: Dec. 30, 2003

(54) SPICE DISPENSING DEVICE

(76) Inventor: Melanie L. Dawn, 49 McCrae Drive, Welland, Ontario (CA), L3C-6C9

( * ) Notice: Subject to any disclaimer, the term of this patent is extended or adjusted under 35 U.S.C. 154(b) by 17 days.

(21) Appl. No.: 10/041,992

(22) Filed: Jan. 9, 2002

(51) Int. Cl.[7] .................................................. A47J 31/00
(52) U.S. Cl. ........................ 99/323; 99/486; 221/312 C; 222/54
(58) Field of Search ........................... 99/323, 494, 485, 99/486; 426/77, 112; 222/54; 221/312 C

(56) References Cited

U.S. PATENT DOCUMENTS 1,040,179 A  *  10/1912  Evans ........................... 99/323
1,168,092 A  *   1/1916  Mauntel ........................ 99/323
2,133,166 A  *  10/1938  Fritsche ........................ 99/323
2,731,908 A  *   1/1956  Morena .................... 99/323 X
5,440,976 A  *   8/1995  Giuliano et al. .......... 99/323 X

* cited by examiner

Primary Examiner—Reginald L. Alexander

(57) ABSTRACT

A spice dispensing device for seasoning food and regulating the proper amounts of spices being used to season the food. The spice dispensing device includes a container including a pair of side members detachably attached to one another; and also includes a funnel being removably disposed in the container for filling the container with selected spices.

3 Claims, 2 Drawing Sheets

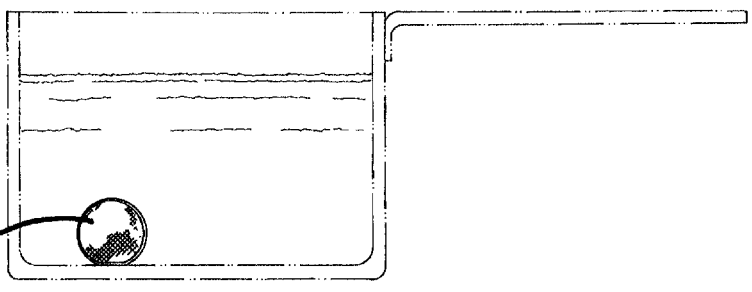
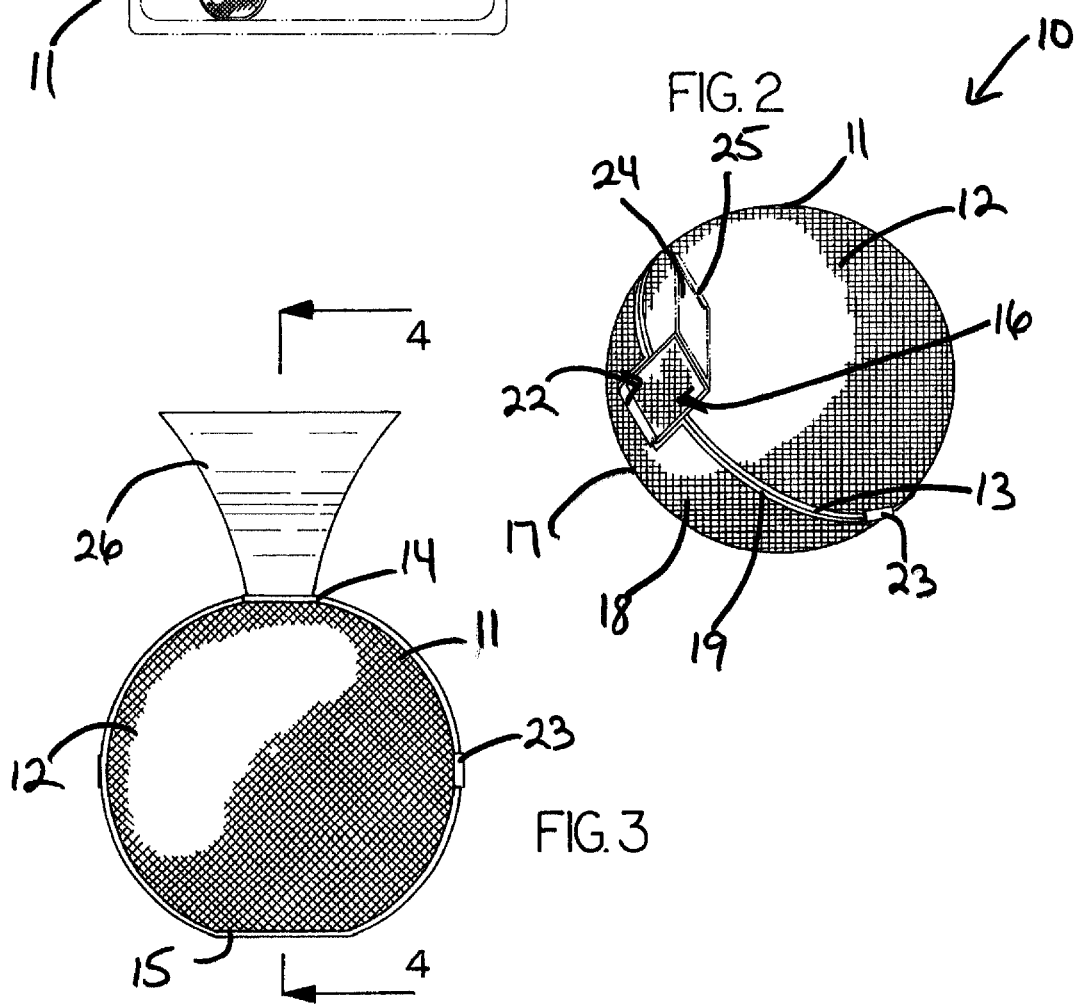

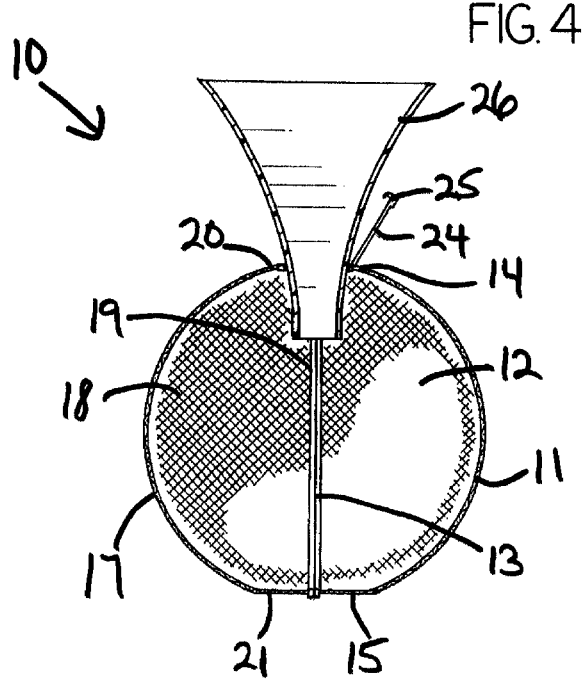
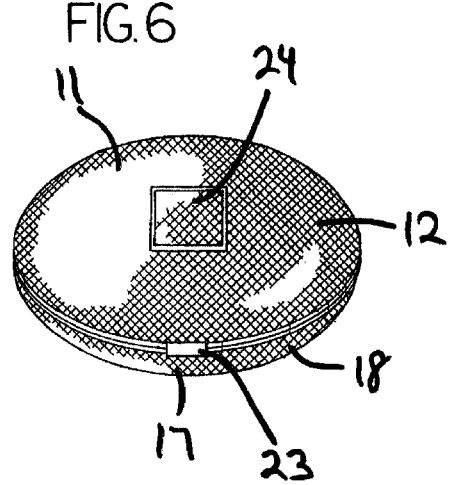
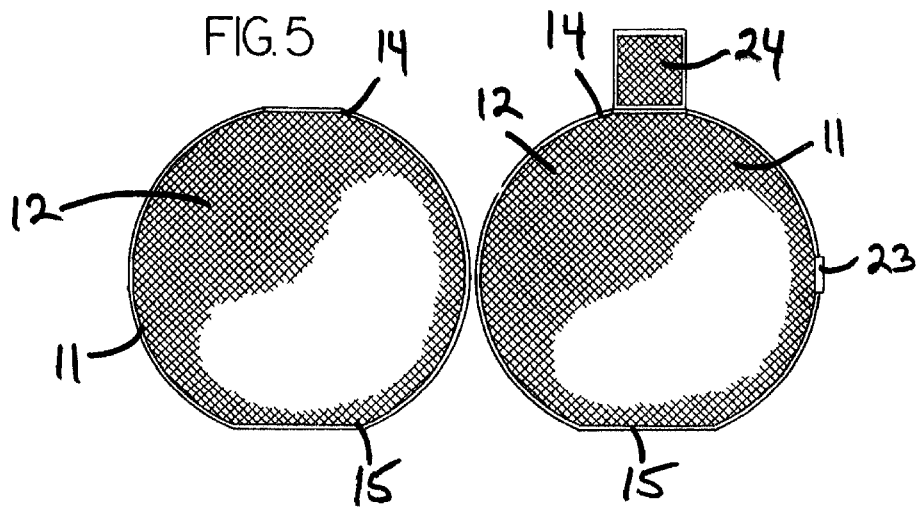

SPICE DISPENSING DEVICE

BACKGROUND OF THE INVENTION

1. Field of the Invention

The present invention relates to spice dispensers and more particularly pertains to a new spice dispensing device for seasoning food and regulating the proper amounts of spices being used to season the food.

2. Description of the Prior Art

The use of spice dispensers is known in the prior art. More specifically, spice dispensers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,067,290; U.S. Pat. No. 2,731,908; U.S. Pat. No. 4,345,512; U.S. Pat. No. 2,291,060; and U.S. Pat. No. Des. 404,609.

While these devices fulfill their respective, particular objectives and requirements, the aforementioned patents do not disclose a new spice dispensing device. The inventive device includes a container including a pair of side members detachably attached to one another; and also includes a funnel being removably disposed in the container for filling the container with selected spices; and allows the user to evenly and efficiently dispense seasoning into foods while the foods are being prepared without the user having to do so manually, a feature not described nor suggested by any of the prior art.

In these respects, the spice dispensing device according to the present invention substantially departs from the conventional concepts and designs of the prior art, and in so doing provides an apparatus primarily developed for the purpose of seasoning food and regulating the proper amounts of spices being used to season the food.

SUMMARY OF THE INVENTION

In view of the foregoing disadvantages inherent in the known types of spice dispensers now present in the prior art, the present invention provides a new spice dispensing device construction wherein the same can be utilized for seasoning food and regulating the proper amounts of spices being used to season the food.

The general purpose of the present invention, which will be described subsequently in greater detail, is to provide a new spice dispensing device which has many of the advantages of the spice dispensers mentioned heretofore and many novel features that result in a new spice dispensing device which is not anticipated, rendered obvious, suggested, or even implied by any of the prior art spice dispensers, either alone or in any combination thereof.

To attain this, the present invention generally comprises a container including a pair of side members detachably attached to one another; and also includes a funnel being removably disposed in the container for filling the container with selected spices.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new spice dispensing device which has many of the advantages of the spice dispensers mentioned heretofore and many novel features that result in a new spice dispensing device which is not anticipated, rendered obvious, suggested, or even implied by any of the prior art spice dispensers, either alone or in any combination thereof.

Still yet another object of the present invention is to provide a new spice dispensing device which provides in the apparatuses and methods of the prior art some of the advantages thereof, while simultaneously overcoming some of the disadvantages normally associated therewith.

Still another object of the present invention is to provide a new spice dispensing device for seasoning food and regulating the proper amounts of spices being used to season the food.

Still yet another object of the present invention is to provide a new spice dispensing device that adds flavor to the foods without the spices actually being put on the foods.

Even still another object of the present invention is to provide a new spice dispensing device that eliminates the risk of over-seasoning the foods.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a new spice dispensing device according to the present invention and shown in use.

FIG. 2 is a perspective view of the present invention.

FIG. 3 is a side elevational view of the present invention.

FIG. 4 is another side elevational view of the present invention.

FIG. 5 is yet another side elevational view of the present invention.

FIG. 6 is a perspective view of a second embodiment of the present invention.

DESCRIPTION OF THE PREFERRED EMBODIMENT

With reference now to the drawings, and in particular to FIGS. 1 through 6 thereof, a new spice dispensing device embodying the principles and concepts of the present invention and generally designated by the reference numeral 10 will be described.

As best illustrated in FIGS. 1 through 6, the spice dispensing device 10 generally comprises a container including a pair of side members 11,17 detachably attached to one another. The side members 11,17 are made of permeable material and are generally concave and are mirrored halves with each of the side members 11,17 including a curved side wall 12,18 having an outer edge 13,19, and also includes an open side, a top end 14,20, and a flat bottom end 15,21 for resting upon a surface. Each of the side members 11,17 also has a slot 16,22 being disposed in a respective outer edge 13,19 and in a respective top end 14,20 thereof. The slots 16,22 are mated to form an opening in the container when the side members 11,17 are closed upon one another.

The spice dispensing device 10 also comprises a means for attaching the side members 11,17 together. The means for attaching the side members 11,17 together includes a hinge member 23 being conventionally attached along portions of the outer edges 13,19 of the side members 11,17, and also includes a lid 24 having an edge hingedly attached along an edge of the slot 16 of one of the side members 11. The lid 24 also has a latch member 25 for fastening to the other of the side members 17. The lid 24 further is removably closed over the opening.

A funnel 26 is removably disposed in the container for filling the container with selected spices. The funnel 26 is removably extended through the opening into the container for filling the container with the selected spices with the funnel 26 being tapered from a top to a bottom.

In use, the user opens the lid 24 and puts selected spices in the container and then closes the lid 24, and places the spice dispensing device 10 in with the food such as a pot which is cooking the food upon which the food would be flavored with the flavoring from the spices permeating through the side walls 11,17 of the container without the spices actually coming into contact with the food.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A spice dispensing device comprising:

a container including a pair of side members detachably attached to one another, said side members being permeable and being generally concave and being mirrored halves with each of said side members including a curved side wall having an outer edge, and also including an open side, a top end, and a flat bottom end for resting upon a surface, each of said side members also having a slot being disposed in a respective said outer edge and in a respective said top edge thereof, said slots being mated to form an opening in said container when said side members are closed upon one another;

a means for attaching said side members together; and a funnel being removably disposed in said container for filling said container with selected spices.

2. A dispensing device as described in claim 1, wherein said means for attaching said side members together includes a hinge member being attached along portions of said outer edges of said side members, and also includes a lid having an edge hingedly attached along an edge of said slot of one of said members, said lid also having a latch member for fastening to the other of said side members, said lid further being removably closed over said opening.

3. A spice dispensing device as described in claim 2, wherein said funnel is removably extended through said opening into said container for filling said container with the selected spices, said funnel being tapered from a top to a bottom.

* * * * *